(12) United States Patent
Feldermann

(10) Patent No.: US 6,409,499 B1
(45) Date of Patent: Jun. 25, 2002

(54) VARIABLE STOICHIOMETRIC COMBUSTION

(75) Inventor: Christian J. Feldermann, Sheffield (GB)

(73) Assignee: The BOC Group plc, Windlesham (GB)

(*) Notice: Subject to any disclaimer, the term of this patent is extended or adjusted under 35 U.S.C. 154(b) by 0 days.

(21) Appl. No.: 09/379,409

(22) Filed: Aug. 24, 1999

(51) Int. Cl.[7] .................................................. F23M 3/02
(52) U.S. Cl. .............................. 431/8; 431/10; 431/158; 431/174; 431/353
(58) Field of Search ........................ 431/2, 8, 10, 158, 431/351, 12, 353, 284, 285, 350, 174, 242

(56) References Cited

U.S. PATENT DOCUMENTS

| | | | |
|---|---|---|---|
| 3,729,285 A | * 4/1973 | Schwedersky | 431/8 |
| 3,976,420 A | * 8/1976 | Takahashi | 431/10 |
| 4,453,913 A | * 6/1984 | Gitman | 431/8 |
| 5,387,100 A | * 2/1995 | Kobayashi | 431/10 |
| 5,954,498 A | * 9/1999 | Joshi | 431/8 |

* cited by examiner

*Primary Examiner*—James C. Yeung
(74) *Attorney, Agent, or Firm*—Joshua L. Cohen; Salvatore P. Pace

(57) ABSTRACT

A method of combustion and an apparatus therefor in which separate streams of very lean and very rich fuel/oxidant mixture are combusted separately, the products of combustion therefrom being thoroughly mixed before final combustion takes place. The lean/rich primary combustion minimizes combustion temperatures and pollutant formation, whilst the final combustion is substantially stoichiometric.

16 Claims, 4 Drawing Sheets

VARIABLE STOICHIOMETRIC COMBUSTION

This invention relates to a method of combustion, in particular to combustion methods which minimize the production of nitrogen oxides ($NO_x$), and to apparatus therefor.

There has long been a drive to reduce or minimize the emission of pollutants such as carbon monoxide (CO), $NO_x$, volatile organic compounds (VOC), dioxins, soot and so on, caused during the combustion of fuels. In recent years environmental legislation has been a consistent impetus, although of late the reduction of harmful emissions has been linked to increased combustion efficiency.

Commercial combustion systems have concentrated on three main methods in order to control emissions: the reduction of in-flame pollutant formation; the promotion of in-flame pollutant destruction, and external pollutant destruction. Each of these methods has both virtues and disadvantages.

Various methods (all of which rely on the kinetic control of the formation of a particular pollutant) have been used to limit the in-flame generation of species such as $NO_x$, CO, various aromatic and polycyclic hydrocarbons. One particularly well-known practice for reducing $NO_x$ emissions is "staging", a method whereby either the fuel or the oxidant is delivered in stages into different parts of the combustion zone, or flame. With staging, the combustion zone is divided into separate regions (usually two) with differing local stoichiometries, at which the rate of formation of certain pollutants (NOX in particular) is very small.

Although effective in reducing $NO_x$ emissions, staging has its limitations due to poor flame stability and mixing, therefore poor combustion efficiency and temperature distribution, and restricted turndown capability. Accordingly, most staging processes are only a compromise between adequate mixing and emission reduction.

In-flame pollutant destruction is not very common, due to poor understanding of the chemical reactions involving in-flame species and their reversibility. One method employing in-flame destruction techniques involves soot formation and destruction. Here, the formation of soot in the flame is promoted, primarily so as to increase radiative heat transfer but also in order to reduce the formation of other pollutants, the soot being destroyed before it can leave the flame by oxidizing agents such as oxygen or OH radicals. There have also been limited trials to demonstrate the in-flame destruction of species such as NOX by injecting active chemicals such as urea into the flame. Overall, however, in-flame pollutant destruction is not practiced widely in commercial combustion.

External pollutant destruction is fairly widely adopted, because of its relative simplicity and its independence of the particular combustion system used. Generally, active chemicals are introduced into the hot waste gases before or after they exit the combustion chamber or the furnace. Methods used include ammonia injection for $NO_x$ destruction, external "reburning" using hydrocarbons such as methane, and oxygen injection for oxidation of CO and VOC. The disadvantages of such methods are that they are costly and inefficient—because by their very nature they are reactive, since even the most modern systems rely on a waste gas analyzer to control the amount and rate of chemical injection depending on the sensed pollutant concentration.

The present invention therefore provides a method of combustion characterized by the steps of:

a) mixing preferably thoroughly, flows of a first fluid fuel and a first fluid oxidant to produce a first, substantially homogeneous, sub-stoichiometric stream close to, at or below the lower flammability limit at ambient pressure;

b) mixing preferably thoroughly, flows of a second fluid fuel and a second fluid oxidant to produce a second, substantially homogeneous, super-stoichiometric stream close to, at or above the upper flammability limit at ambient pressure;

c) combusting said first and second streams separately and substantially simultaneously to produce first and second products of combustion, combustion of the second stream being sustained;

d) mixing preferably thoroughly, the first and second products of combustion upstream of nozzle means so as to produce a substantially homogeneous mixed stream, and e) passing the mixed stream through the nozzle means and causing the mixed stream to combust downstream thereof, whereby the first and second fluid fuels are substantially combusted.

One significant advantage of such a method is its capability of reducing emissions to so-called "ultra low" levels. For $NO_x$ this limit lies below 10 ppm, and is not achievable with conventional combustion methods.

In order to achieve ultra low emissions, the method of the invention relies on the combustion of a fuel (gaseous, liquid or solid) with an oxidant (oxygen or oxygen-enriched air) in two separate spatial locations, or zones, with different stoichiometries. The stoichiometric ratio is defined as the ratio between the actual fuel/oxidant ratio and that fuel/oxidant ratio required for complete combustion. In the case of methane, the stoichiometric mixture for complete combustion comprises about 33% methane in oxygen; so, the stoichiometric ratio of a mixture containing one volumetric part of methane to two parts of oxygen will have a value of one. A substoichiometric (or rich) mixture will contain less oxidant than the amount theoretically required for complete combustion, and will have a stoichiometric ratio of more than one. The reverse applies for a superstoichiometric (or lean) mixture. In this invention, the actual stoichiometries in each zone are different, and each zone has a specific function.

One zone is used to combust a substoichiometric mixture of oxidant and fuel close to or at the lower flammability limit, while the other, separate zone is used to combust a superstoichiometric mixture at or even above the upper limit of flammability and to stabilize the flame thereat. At the conclusion of combustion in each zone, the mixtures of hot products leaving each zone are mixed, externally of the zones, to produce a final flame and to achieve complete combustion - whilst producing ultra low emission levels.

Under given ambient conditions there are upper (or rich) and lower (or lean) limits of flammability, and within these limits self propagation of a flame can occur only after the mixture has been ignited. For example, the lower flammability limit of methane in air or oxygen is reached at about 5% methane. The upper limit is about 15% methane for air and 61% methane for oxygen. At room temperature and atmospheric pressure (1 atmosphere, or 1.013 bar, or $7.6 \times 10^2$ torr, or $1.013 \times 10^5$ Pa, or 1.033 kgf $cm^{-2}$) in an oxygen atmosphere no flame will propagate where there is less than 5% or more than 61% methane. This also defines the safety limits of methane/oxygen mixtures. In general, the flammability limits are widened with increasing pressure and/or temperature. Very preferably, the compositions of the lean and rich streams are, if not coincident with, very close to the relevant flammability limit, principally so as to achieve the ultra low emission levels but also to minimize problems of flame propagation where the composition is above the upper flammability limit, or below the lower flammability limit. For oxygen/methane mixtures, for example, the compositions are preferably between about 3% and 6% and between about 61% and 68%.

A stoichiometric fuel/oxidant mixture will combust to produce a large proportion of carbon dioxide ($CO_2$) and water (in the case of methane/oxygen) and will show the highest flame temperature achievable with such mixtures (in practice the maximum temperature is found by combusting mixtures slightly above stoichiometric (i.e. stoichiometric ratio slightly greater than one) due to kinetic effects). If the mixture to be combusted is markedly sub-superstoichiometric, lower temperatures are achieved, with the lowest temperatures being found at the flammability limits (flame temperatures at the flammability limits can be as low as 1200° C., or less). At the flammability limits kinetic effects restrict flame propagation due to the very low flame temperatures, as well as through dilution effects and enthalpy change of the mixture. In the method of the invention, the mixtures used in each zone will generate flames with the lowest temperatures possible for a particular fuel. This means that apparatus in accordance with this invention can be of relatively simple design and construction, without requiring complex cooling systems or special, high-temperature-resistant materials. Moreover, the formation of pollutants, such as $NO_x$ and soot, is known to be very dependent on temperature. Not only does the low temperature combustion of the substoichiometric and superstoichiometric streams inhibit the formation of such pollutants, but also it inhibits the formation of the of these, so that the subsequent combustion of the products of combustion of the streams produces very few such pollutants.

As stated above, flame propagation is difficult with mixtures at the flammability limits, and in each zone problems of flame stability, flame stretching and blow off need to be addressed. Above the upper flammability limit it is necessary positively to sustain a flame, by means of a pilot flame or a spark ignition system, for example. Similar measures are sometimes necessary below the lower flammability limit, although in practice with oxygen/methane mixtures it has surprisingly been found that flames will propagate below the lower flammability limit with only intermittent re-ignition being required. In order to stabilize the lean and rich flames it is necessary fully to mix the fuel and oxidant prior to combustion in the respective zone, so that combustion only commences once a thoroughly mixed, essentially homogeneous fuel/oxidant mixture stream has been achieved.

This thorough mixing may be achieved by injecting the fluid having the lower mass flow rate into the flow of the fluid having the higher mass flow rate. In the case of a substoichiometric stream the fuel would be injected into the oxidant which would act as a carrier gas. The reverse occurs for a superstoichiometric stream. The injection occurs with a very high velocity ratio between fuel and oxidant preferably above 60:1 and up to 100:1, so that intense mixing is achieved in a short time and over a short distance.

Mixing can be improved even further by adding a shear effect through applying counter-rotating swirl to the gases. Those skilled in the art will realize that there are many ways of promoting the necessary turbulence and/or shear in combining the flows of fuel and oxidant so as to ensure thorough mixing, such as by introducing fuel or oxidant into the most turbulent region, promoting counter-rotating swirling flows, direct flow impingement, recirculation of flows around a bluff body, or combinations of these. Small ignition energies are needed for lean mixtures and a spark is usually sufficient to ignite said mixtures. In order to achieve sufficient combustion intensity the residence time needs to be increased as much as possible. Residence times of at least 100 ms are preferable in order to move close to the equilibrium composition for the given temperature.

The problem of flame stability in the substoichiometric, or rich, zone is addressed using an approach similar to the lean zone. Fuel and oxidant are mixed rapidly through a very short distance. This time the oxidant would be injected into the fuel stream, which acts as the carrier. Flame stabilization is analogous to the superstoichiometric case.

Rich flames are used in industry for the production of CO and $H_2$ (hydrogen) as well as soot/carbon black. Most industrial applications set the mixture composition just below the stoichiometric limit. Problems with flame stability and control of the product ratios arise at compositions closer to the lower limit of flammability. Formation of large polycyclic aromatic hydrocarbons as well as soot are undesirable for most applications due to their possibly carcinogenic properties. On the other hand it is well known that rich mixtures tend to suppress $NO_x$ formation through the reverse reaction of NO and $NO_2$ to HCN and $N_2$ (nitrogen) with the help of hydrocarbon radicals found under these conditions. This invention makes use of this fact but avoiding the generation of soot and VOC.

A mixture not sufficiently close to the upper flammability limit will produce large amounts of VOC and soot when burnt. The formation of these species is both thermodynamically and kinetically controlled and shows a strong temperature dependence. Soot formation especially, will start at about 1200 to 1400° C., depending on the fuel and conditions. This invention therefore describes a method to burn rich fuel/oxidant mixtures below this temperature range. This can be achieved either by combusting mixtures very close or at the upper limit or even above the upper limit. Flames obtained beyond the upper flammability limit are called cool (or cold) flames due to their very low temperature. The temperatures observed in these flames are well below 1000° C. and under those conditions the rate of combustion is very slow. Stabilization of such flames can be achieved using above mentioned method but ignition can be sustained via a continuous heat source with a temperature between 600° and 1000° C. For this purpose a small amount of fuel and oxidant is diverted and used as a pilot flame for the rich zone. A very small amount of fuel is needed for this pilot flame, usually 1/100 of the total flow will suffice. Whereas the normal flame range centers approximately about the theoretical mixture for complete combustion (stoichiometric mixture) the cool flame range centers about the compositions most reactive in slow combustion.

The method in accordance with the invention also comprises a mixing zone located downstream of the combustion zones and made up of a nozzle means or flameholder. Here, the hot flame gases from each combustion zone are mixed in order to achieve complete combustion. Because the precursors of the polluting species have not been formed, and having made sure that the mixing is completely homogeneous, ultra low emission levels can be achieved. The function of the nozzle means is to provide an anchor-point for the flame and to aerodynamically shape the flame itself. Homogeneous mixing can be achieved by different methods such as by imposing a swirling motion to the individual flows or by setting a velocity ratio different to 1:1.

A further significant advantage of this invention is the ability to generate certain gas mixtures. It is possible to withdraw products of combustion from the rich zone, such as specific mixtures of $CO/H_2/N_2/CO_2$, which are of particular use for the metals industry, or other mixtures for other applications, and this invention allows a novel and cheap way of producing such mixtures out of any hydrocarbon or other fuel without generating soot, and at useful temperatures. To compensate for the gas mixture withdrawn, the mass flow rates of one or both streams would ideally be addressed, in order to ensure complete combustion in the downstream combustion step.

The invention will now be described by way of example, and with reference to the accompanying drawings in which.

Figure 1:
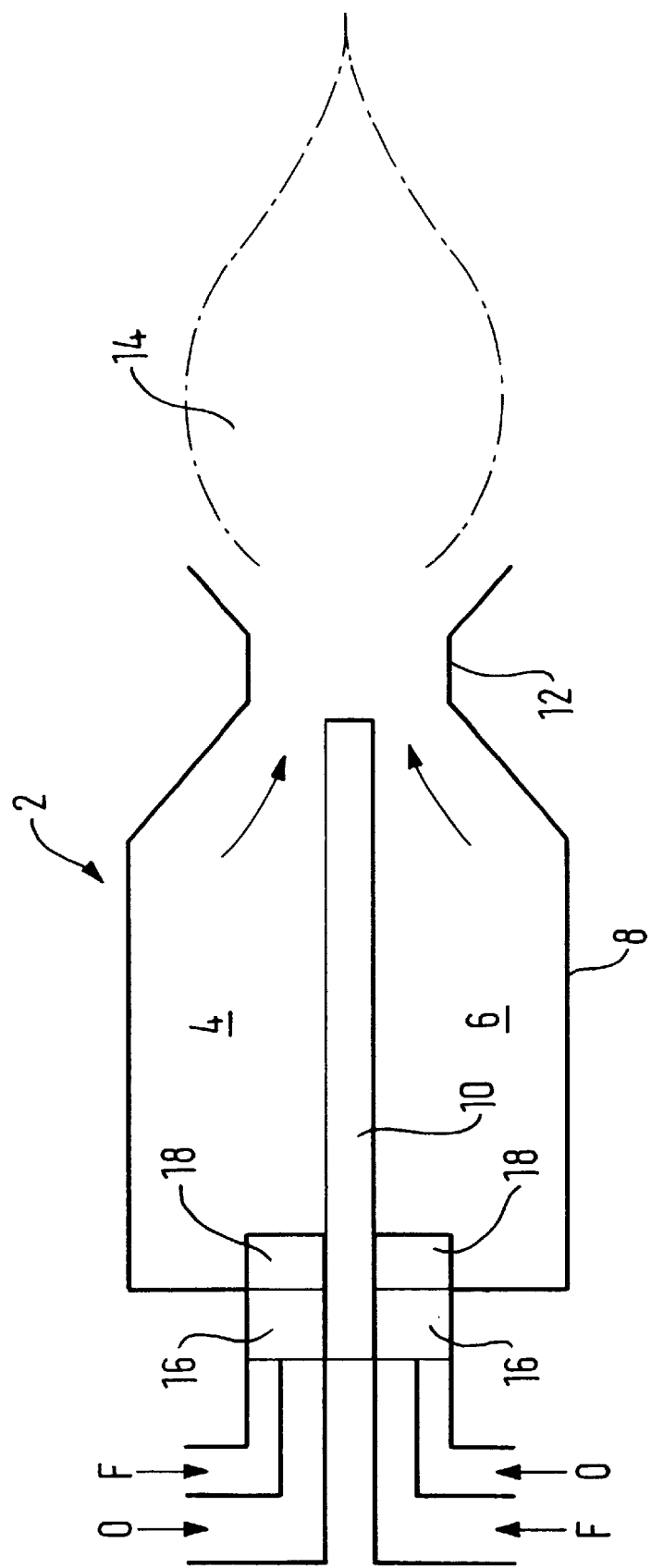
FIG. 1 is a schematic view of a first embodiment of a burner for carrying out the method of combustion in accordance with the invention.

The burner 2 in FIG. 1 comprises two combustion chambers 4, 6, shown here formed within a single chamber 8 divided by a separation plate 10, and having a single common nozzle 12 from which a final flame 14 is discharged. Fluid fuel F and oxidant O are supplied to mixing devices 16 located within each of the combustion chambers.

The fuel and oxidant supplies are such that a very 'lean' mixture is supplied to the mixing device 16 located in chamber 4, and a very 'rich' mixture to the mixing device 16 in chamber 6. The fuel and oxidant are thoroughly mixed in each device 16 and, as they issue therefrom, ignite and combust. Combustion is completed to the extent that all of the oxidant supplied to each chamber is used up within that chamber; hot products of combustion, including uncombusted oxidant, are discharged from the lean chamber 4, and hot products of combustion including unburnt fuel are discharged from the rich chamber 6. These flows are mixed as they approach and pass through the nozzle 12, before completing combustion in the final flame 14. The amounts of fuel and oxidant are not only chosen so as to produce combustion adjacent the upper and lower flammability limits in the respective chambers 6, 4 but also so as to obtain a predetermined fuel: oxidant ratio for the final flame 14. This ratio can be substantially stoichiometric, or it can be otherwise—sometimes it is desirable to provide slightly oxidizing or reducing conditions. This minimizes the production of harmful emissions, through the low temperatures in each of the combustion chambers (which discourage the formation of $NO_x$ and precursors thereof) and the stoichiometric nature of the final combustion.

The following example illustrates the effectiveness of combustion in accordance with this invention (all proportions given as dry volume %):

| | | |
|---|---|---|
| Supply to rich chamber: | 33% Oxygen | |
| | 67% Natural gas (methane) | |
| Temperature in rich chamber: | 746° C. | |
| Products of Combustion in rich chamber: | Methane | 5.47% |
| | Carbon Monoxide (CO) 30.8% | |
| | Carbon Dioxide ($CO_2$) | 1.8% |
| | Hydrogen ($H_2$) | 61.8% |
| | Nitrogen ($N_2$) | 0.056% |
| | Oxygen ($O_2$) | 0 |
| | Nitrogen Monoxide (NO) | $7.3 \times 10^{-20}\%$ |
| Supply to lean chamber: | 95% Oxygen | |
| | 5% Natural Gas | |
| Temperature in lean chamber: | 1177° C. | |
| Products of Combustion in lean chamber: | Methane | 0 |
| | CO | $2 \times 10^{-5}\%$ |
| | $CO_2$ | 5.64% |
| | $H_2$ | $1 \times 10^{-5}\%$ |
| | $N_2$ | 0.007% |
| | $O_2$ | 94.33% |
| | $O_2$ | 0.0002% |
| | OH | 0.009% |
| | NO | 0.002% |
| | Nitrogen Dioxide | $2 \times 10^{-5}\%$ |
| Temperature of final Combustion: | 1997° C. | |
| Products of final Combustion: | Methane | 0 |
| | CO | 0.7% |
| | $CO_2$ | 25.8% |
| | $H_2$ | 43.8% |
| | $N_2$ | 0.04% |
| | $O_2$ | 11.8% |
| | OH | 17.0% |
| | O | 0.14% |
| | NO | 0 |

Figure 2:
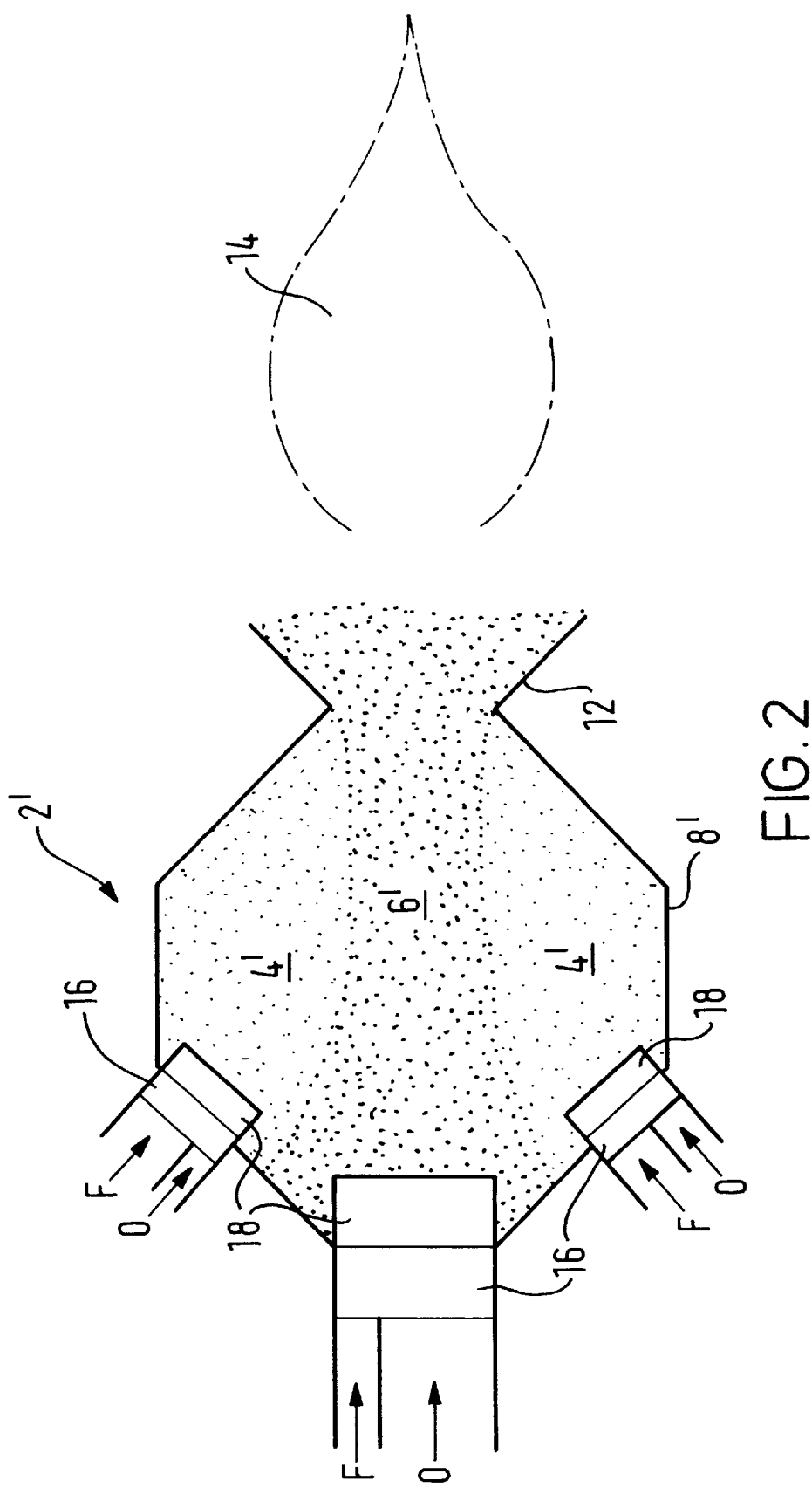
FIG. 2 is a schematic view of a second embodiment of such a burner.
Figure 3A:
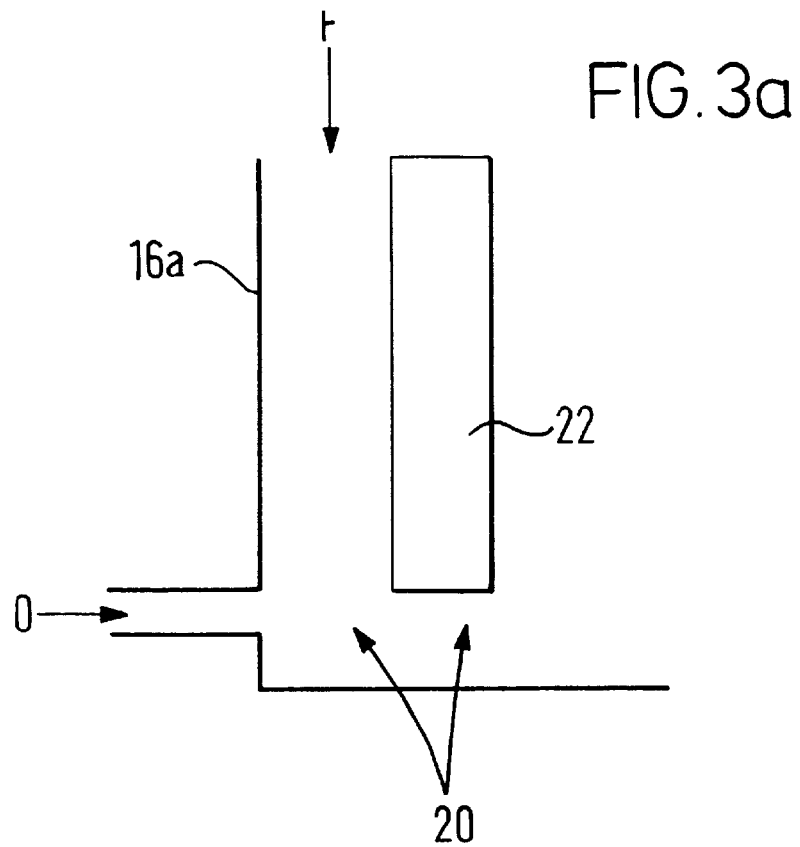
FIGS. 3a to 3d are schematic views of various devices for mixing a fuel and an oxidant in lean or rich proportions.
Figure 3B:
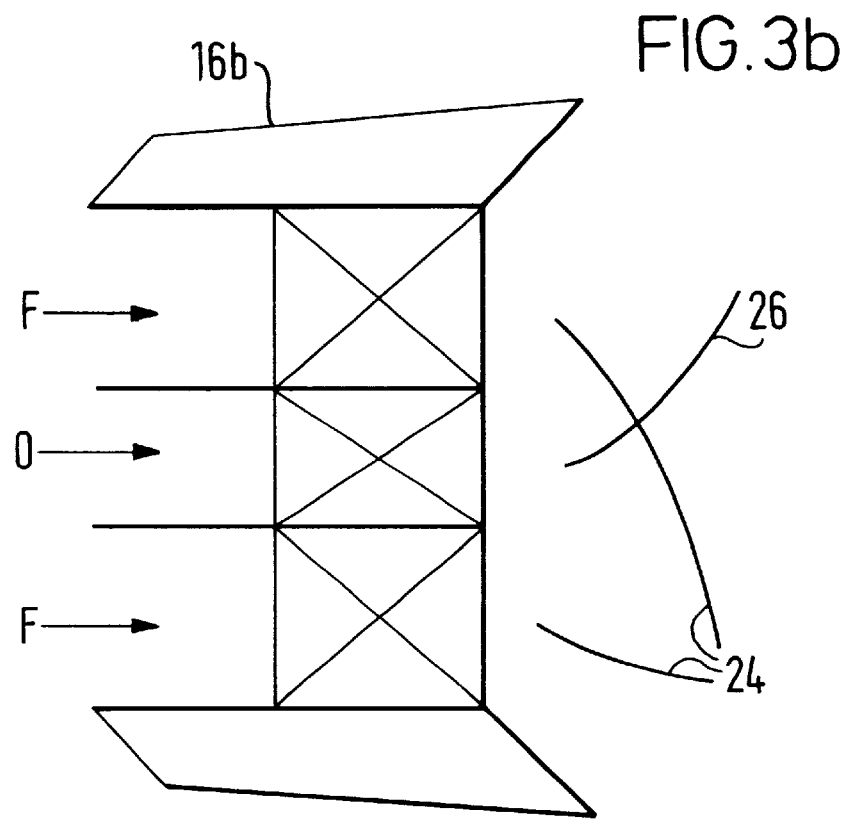
Figure 3C:
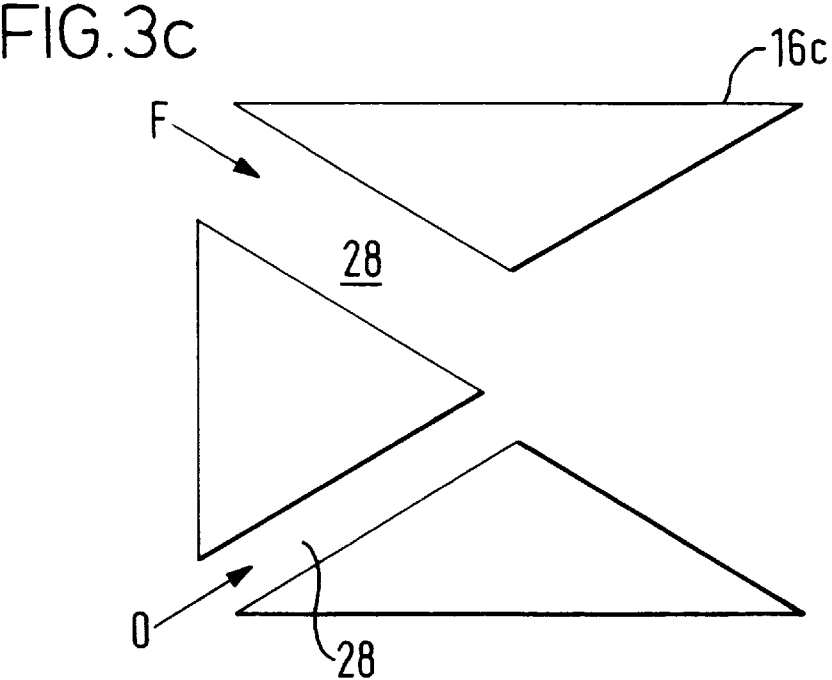
Figure 3D:
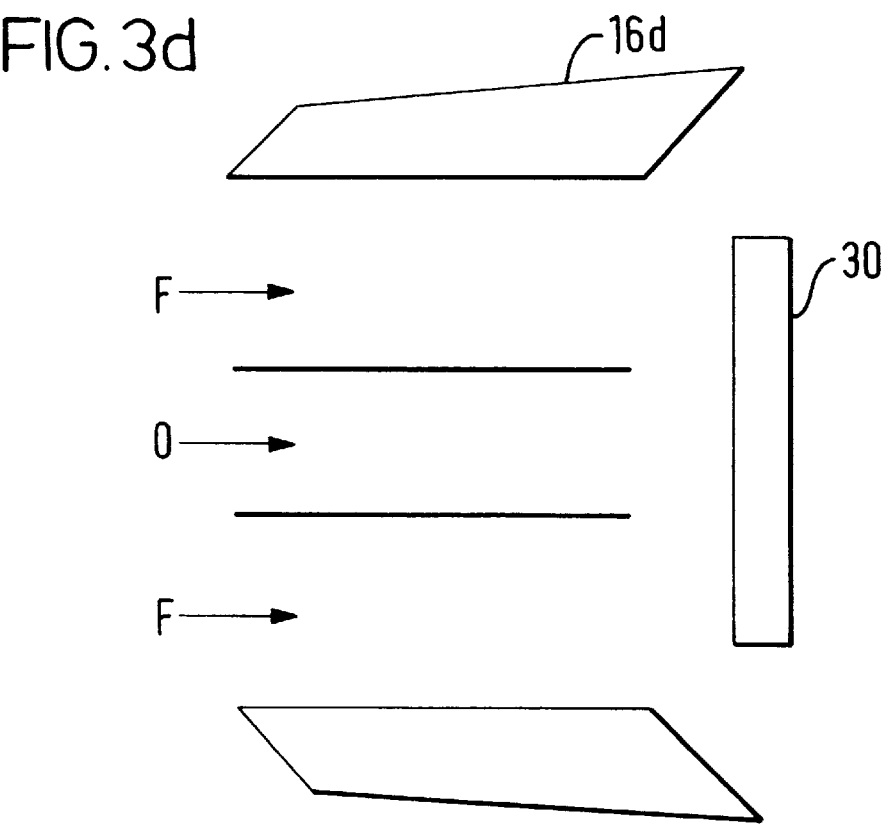

Referring now to FIG. 2, a burner 2' is shown having many features similar to those of the burner 2 of FIG. 1. Features in FIG. 2 which are to all extent identical to those in FIG. 1 are hereafter referred to by the same reference numeral or letter; reference numerals with a prime denote features with similar function but a different configuration. It will be seen that burner 2' has no physical separation means such as the plate 10 in FIG. 1. Rather, distinct lean and rich combustion zones 4', 6' are created within the chamber 8' by virtue of the separate flames produced from each mixing device 16, as is known in the art.

Each of the mixing devices 16 shown in FIGS. 1 and 2 is shown provided with a flame igniter/stabilizer 18. This is necessary both to ignite the flame initially and to propagate a flame beyond the flammability limit. In practice, however, it has been found that flame propagation is not a problem below the lower flammability limit. The most common form of stabilizer is a pilot light, fueled by very small amounts of the fuel and oxidant drawn from the supply to a particular mixing device 16.

FIGS. 3a to 3d show different devices for thoroughly mixing fuel and oxidant, and suitable for use in the present invention. In all cases, the flows of fuel F and oxidant O are purely illustrative of the techniques involved, and could be exchanged.

Mixing device 16a operates on the principle of introducing fuel F into the most turbulent region 20 of the flow of oxygen O, here seen flowing past a bluff body.

Mixing device 16b comprises counter-directed blades or vanes 24, 26 adapted to create counter-rotating streams of fuel F and oxygen O; the swirling motion of the flows causes thorough mixing.

Mixing device 16c operates by the direct impingement of the flows of fuel F and Oxidant O, brought about by conduits 28 which are disposed so as to direct the flows to converge together.

Finally, mixing device 16d comprises a bluff body 30 into direct impingement contact with which are brought separate but essentially parallel flows of fuel F and oxidant O. In passing the body 30, these flows are thoroughly mixed.

Many alternative mixing devices, such as combinations of the above, will be apparent to those skilled in the art. Also, although described in particular with reference to methane, the present invention is applicable to any fluid fuel, such as a gas or an atomized stream of a liquid fuel, and to oxygen-enriched air, air or any other fluid oxidant.

I claim:

1. A method of combustion comprising the steps of:
   a) mixing flows of a first fluid fuel and a first fluid oxidant each having a velocity to produce a first, substantially homogeneous, sub-stoichiometric stream close to, at or below the lower flammability limit at ambient pressure;
   b) mixing flows of a second fluid fuel and a second fluid oxidant each having a velocity to produce a second, substantially homogeneous, super-stoichiometric stream close to, at or above the upper flammability limit at ambient pressure;
   c) combusting said first and second streams separately and substantially simultaneously to produce first and second products of combustion, combustion of the second stream being sustained;
   d) mixing the first and second products of combustion upstream of a nozzle means so as to produce a substantially homogeneous mixed stream, and
   e) passing the mixed stream through the nozzle means and causing the mixed stream to combust downstream thereof, whereby the first and second fluid fuels are substantially combusted.

2. The method according to claim 1 wherein the mixing of step a) and/or of step b) comprises injecting the fluid having the lower mass flow rate into the flow of the fluid having the higher mass flow rate.

3. The method according to claim 1 wherein the ratio of the velocity of the first fluid fuel to the velocity of the first fluid oxidant immediately prior to their mixture in the first stream is at least 60:1.

4. The method according to claim 1 wherein the ratio of the velocity of the second fluid fuel to the velocity of the second fluid oxidant immediately prior to their mixture in the second stream is at least 60:1.

5. The method according to claim 1 wherein the mixing step a) and the mixing step b) continues for at least 0.1 second before the combustion of step c) commences.

6. The method according to claim 1 wherein the velocities of the first and second streams are substantially different at the commencement of step d).

7. The method according to claim 1 wherein combustion of the second stream is sustained by means of a pilot flame said pilot flame being fueled by a portion of the second fluid fuel drawn from the flow thereof and a near-stoichiometric quantity of oxidant.

8. The method according to claim 7 wherein the said quantity of oxidant is a portion of the flow of first or second fluid oxidant.

9. The method according claim 1 further comprising withdrawing a proportion of the products of combustion of the second stream prior to step d).

10. The method according to claim 9 comprising adjusting the mass flow rates of the first and/or second streams according to the quantity of products of combustion withdrawn.

11. The method according to claim 1 wherein the first and second fluid oxidant are selected from the group consisting of gaseous oxygen and oxygen-enriched air.

12. The method according to claim 1 wherein the mixing steps a), b) and d) results in a thorough mixing.

13. A combustion apparatus comprising:
   (a) a first mixing chamber capable of mixing a first fluid fuel and first fluid oxidant to produce a first stream,
   (b) a second mixing chamber capable of mixing a second fluid fuel and a second fluid oxidant to produce a second stream,
   (c) independent means for combusting said first and second streams separately to produce first and second products of combustion,
   (d) a stream mixing chamber for mixing said first and second products of combustion to produce a mixed stream, and
   (e) a nozzle means capable of causing combusting the mixed stream downstream thereof.

14. The combustion apparatus of claim 1 wherein said independent mixing means is an ignitor/stabilizer.

15. The combustion apparatus of claim 2 wherein said nozzle also includes an ignitor/stabilizer.

16. The combustion apparatus of claim 1 which includes a third mixing chamber capable of mixing a third fluid fuel and third fluid oxidant to produce a third stream and means for combusting said third stream separately from said first and second streams to produce a third product of combustion and mixing said third product of combustion with said first and second products of combustion in said stream mixing chamber to produce said mixed stream.

* * * * *